United States Patent
Hayashi

(10) Patent No.: US 9,821,494 B2
(45) Date of Patent: Nov. 21, 2017

(54) MOLD RELEASE TREATMENT METHOD AND METHOD FOR PRODUCING ANTI-REFLECTIVE FILM

(71) Applicant: Sharp Kabushiki Kaisha, Osaka-shi, Osaka (JP)

(72) Inventor: Hidekazu Hayashi, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 495 days.

(21) Appl. No.: 14/387,623

(22) PCT Filed: Mar. 25, 2013

(86) PCT No.: PCT/JP2013/058531
§ 371 (c)(1),
(2) Date: Sep. 24, 2014

(87) PCT Pub. No.: WO2013/146656
PCT Pub. Date: Oct. 3, 2013

(65) Prior Publication Data
US 2015/0321386 A1    Nov. 12, 2015

(30) Foreign Application Priority Data
Mar. 26, 2012 (JP) .................. 2012-069229

(51) Int. Cl.
| B29C 33/00 | (2006.01) |
| B29C 33/62 | (2006.01) |
| B29C 59/16 | (2006.01) |
| B29C 59/02 | (2006.01) |
| B29C 33/42 | (2006.01) |
| B29C 33/58 | (2006.01) |
| B29C 33/64 | (2006.01) |
(Continued)

(52) U.S. Cl.
CPC ............ *B29C 33/62* (2013.01); *B29C 33/424* (2013.01); *B29C 33/58* (2013.01); *B29C 33/64* (2013.01);
(Continued)

(58) Field of Classification Search
CPC ..................................................... B29C 33/62
See application file for complete search history.

(56) References Cited

U.S. PATENT DOCUMENTS

| 6,359,735 B1 | 3/2002 | Gombert et al. |
| 2003/0205475 A1 | 11/2003 | Sawitowski |
(Continued)

FOREIGN PATENT DOCUMENTS

| JP | 2001517319 A | 10/2001 |
| JP | 2003531962 A | 10/2003 |
(Continued)

OTHER PUBLICATIONS

International Search Report PCT/ISA/210 for International Application No. PCT/JP2013/058531 dated Jul. 2, 2013.

*Primary Examiner* — Alison L Hindenlang
*Assistant Examiner* — Jamel M Nelson
(74) *Attorney, Agent, or Firm* — Harness, Dickey & Pierce, P.L.C.

(57) ABSTRACT

A mold release processing method according to an embodiment of the present invention includes the steps of: (a) providing a mold releasing agent, including a fluorine-based silane coupling agent and a solvent, and a mold of which the surface has a porous alumina layer; (b) applying the mold releasing agent onto the surface; and (c) heating, either before or after the step (b), the surface to a temperature not less than 40° C. and less than 100° C. in an ambient with a relative humidity of 50% or more.

6 Claims, 5 Drawing Sheets

(51) Int. Cl.
*C25D 1/22* (2006.01)
*B29L 11/00* (2006.01)
*B29K 33/00* (2006.01)

(52) U.S. Cl.
CPC .............. *B29C 59/02* (2013.01); *B29C 59/16* (2013.01); *C25D 1/22* (2013.01); *B29K 2033/00* (2013.01); *B29K 2601/12* (2013.01); *B29K 2883/00* (2013.01); *B29K 2905/02* (2013.01); *B29K 2995/0064* (2013.01); *B29L 2011/00* (2013.01)

(56) References Cited

U.S. PATENT DOCUMENTS

| | | |
|---|---|---|
| 2007/0159698 A1 | 7/2007 | Taguchi et al. |
| 2009/0194914 A1 | 8/2009 | Uozu et al. |
| 2012/0308678 A1 | 12/2012 | Hayashi et al. |
| 2013/0004612 A1 | 1/2013 | Isurugi et al. |

FOREIGN PATENT DOCUMENTS

| | | | |
|---|---|---|---|
| JP | 2005156695 A | 6/2005 | |
| JP | 2005270801 A | 10/2005 | |
| JP | 2010005841 A | 1/2010 | |
| JP | WO 2011118591 A1 * | 9/2011 | ............. B29C 33/58 |
| WO | WO-2006059686 A1 | 6/2006 | |
| WO | WO-2008001847 A1 | 1/2008 | |
| WO | WO-2011/105206 A1 | 9/2011 | |
| WO | WO-2011111669 A1 | 9/2011 | |
| WO | WO-2011118591 A1 | 9/2011 | |
| WO | WO-2012133390 A1 | 10/2012 | |

* cited by examiner (a)

(b)

(c)

(d)

(e)

MOLD RELEASE TREATMENT METHOD AND METHOD FOR PRODUCING ANTI-REFLECTIVE FILM

TECHNICAL FIELD

The present invention relates to a mold release processing method and a method of making an antireflection film. In this description, the "mold" refers herein to a mold which can be used in stamping, casting and various other forming methods and will be sometimes referred to herein as a "stamper". The mold may also be used in printing (including nano-printing).

BACKGROUND ART

Display devices for use in TVs, cellphones, and various other devices and optical elements such as a camera lens usually adopt antireflection techniques in order to reduce surface reflection and increase the quantity of light transmitted through them. The reason is that when light is transmitted through the interface between multiple media with mutually different refractive indices (e.g., when light is incident on the interface between the air and glass), the quantity of transmitted light decreases due to Fresnel reflection and other factors, thus deteriorating the visibility.

According to one of those antireflection techniques that has attracted a lot of attention these days, a very small uneven pattern in which the pitch of its recessed and raised portions is adjusted to be equal to or smaller than the wavelength of visible light (with $\lambda$=380 nm to 780 nm) is formed over the surface of the substrate (see Patent Documents 1 to 4). Those raised portions which form part of the uneven pattern that produces the antireflection function have a two-dimensional size of 10 nm to less than 500 nm.

This method uses the principle of a so-called "moth-eye structure". The refractive index with respect to light that has been incident on the substrate is continuously changed in the depth direction of the recessed and raised portions from the refractive index of a medium on which the light has been incident to the refractive index of the substrate, thereby reducing reflection significantly in the wavelength range in which reflection needs to be reduced.

The moth-eye structure is advantageous because the structure not only performs the antireflection function with small incident angle dependence over a wide wavelength range but also is applicable to a lot of materials and contributes to forming an uneven pattern on the substrate directly. That is why by adopting the moth-eye structure, a high-performance antireflection film can be provided at a lower cost.

The moth-eye structure may be formed using an anodized porous alumina layer which is obtained by anodizing aluminum (see Patent Documents Nos. 2 to 4, for example).

Hereinafter, the anodized porous alumina layer which is obtained by anodizing aluminum will be described briefly. A method of forming a porous structure by anodization has attracted a lot of attention in the related art as a simple method for making nanometer-scale circular cylindrical nanopores (very small recessed portions) which are arranged regularly. If a base is immersed in an acidic or alkaline electrolytic solution of sulfuric acid, oxalic acid, phosphoric acid, or any other appropriate acid, and if a voltage is applied thereto using the base as an anode, oxidation and dissolution will advance concurrently on the surface of the base. As a result, an oxide film with a huge number of nanopores can be formed over the surface of the base. These circular cylindrical nanopores are arranged perpendicularly to the oxide film and exhibit self-organized regularity under a certain condition (including voltage, electrolyte type, and temperature). Thus, this anodized porous alumina layer is expected to be applied to a wide variety of functional materials.

In a porous alumina layer which has been formed under a particular condition, generally regular hexagonal cells have a closest packed two-dimensional arrangement when viewed along a normal to the film surface. At the center of each of those cells, there are nanopores which are arranged periodically. The cells are formed as a result of local dissolution and growth of a coating. The dissolution and growth of the coating advance concurrently at the bottom of the nanopores (that is a so-called "barrier layer"). It is known that the interval between adjacent nanopores (i.e., the distance between their centers) is approximately twice the thickness of the barrier layer and is approximately proportional to the voltage that is applied during the anodization. It is also known that the diameter of the nanopores depends on the type, concentration, temperature, and other parameters of the electrolytic solution but is usually about one-third of the size of the cell (i.e., the length of the longest diagonal of the cell when viewed along a normal to the film surface). Such nanopores of the porous alumina may form an arrangement with high regularity (or periodicity) under a particular condition, or an arrangement with a somewhat decreased degree of regularity depending on the condition, or an irregular (non-periodic) arrangement.

Patent Document 2 discloses a method of forming an antireflection film (or antireflection surface) using a stamper, of which the surface has an anodized porous alumina film.

Meanwhile, Patent Document 3 discloses a technique for forming tapered recesses with continuously changing pore diameters by performing anodization of aluminum and a pore diameter increasing process a number of times.

The applicant of the present application discloses, in Patent Document 4, a technique for forming an antireflection film using an alumina layer in which very small recessed portions have stepped side surfaces.

As described in Patent Documents 1, 2, and 4, by providing an uneven structure (macro structure) which is larger in size than a moth-eye structure (micro structure) in addition to the moth-eye structure, the antireflection film (antireflection surface) can have an antiglare function. The raised portions that form part of the uneven structure to realize the antiglare function have a two-dimensional size of 1 μm to less than 100 μm. The entire disclosures of Patent Documents Nos. 1, 2 and 4 cited above are hereby incorporated by reference.

If the anodized porous alumina film is used, a mold for forming a moth-eye structure on the surface (which will be referred to herein as a "moth-eye mold") can be made easily. In particular, as disclosed in Patent Documents 2 and 4, if the surface of the anodized oxide film of aluminum is used as a mold as it is, the manufacturing cost can be cut down significantly, which is beneficial. The structure of the surface of a moth-eye mold which can form a moth-eye structure will be referred to herein as an "inverted moth-eye structure".

A known method of forming an antireflection film using a moth-eye mold uses a photocurable resin. First of all, a photocurable resin is applied over a substrate. Then, an uneven surface of a moth-eye mold which has undergone a mold release process is pressed against the photocurable resin in a vacuum, thereby filling the uneven structure on the surface of the moth-eye mold with the photocurable resin. Then, the photocurable resin in the uneven structure is irradiated with an ultraviolet ray so that the photocurable resin is cured. Thereafter, the moth-eye mold is removed from the substrate, thereby forming a cured layer of the photocurable resin, to which the uneven structure of the moth-eye mold has been transferred, over the surface of the substrate. Such a method of forming an antireflection film using a photocurable resin is disclosed in Patent Document 4, for example.

As an exemplary mold release process to be carried out on a mold with a porous alumina layer which is used to make an antireflection film, Patent Document No. 5 teaches performing the mold release process by adding a fluorine-based mold releasing agent by spray coating method.

Meanwhile, Patent Document No. 6 says that in making a lens by cast molding process, if a mold release agent diluted with a solvent is applied only once and then only the solvent is applied in order to coat the mold with the mold releasing agent uniformly, the resultant layer of the mold releasing agent can have a uniform thickness.

CITATION LIST

Patent Literature

Patent Document No. 1: PCT International Application Japanese National Phase Publication No. 2001-517319
Patent Document No. 2: PCT International Application Japanese National Phase Publication No. 2003-531962
Patent Document No. 3: Japanese Laid-Open Patent Publication No. 2005-156695
Patent Document No. 4: PCT International Application Publication No. 2006/059686
Patent Document No. 5: PCT International Application Publication No. 2008/001847
Patent Document No. 6: Japanese Laid-Open Patent Publication No. 2005-270801
Patent Document No. 7: PCT International Application Publication No. 2011/111669

SUMMARY OF INVENTION

Technical Problem

The applicant of the present application developed a method of making an antireflection film efficiently by roll-to-roll method using a roll-shaped moth-eye mold (see Patent Document No. 7, for example). The present inventors discovered that a fluorine-based mold releasing agent certainly exhibited better mold release ability than a silicone-based mold releasing agent or any other mold releasing agent but that when the fluorine-based mold releasing agent was applied to a continuous manufacturing process by the roll-to-roll method, its mold release ability declined so early as to constitute a factor that would interfere with increasing the mass productivity sufficiently.

Even though it has been described what problem will arise in the related art when a roll-shaped moth-eye mold is used to make an antireflection film, the short sustainability of mold release ability is a common problem which will be observed in any mold, of which the surface has a porous alumina layer with very small recesses of a sub-micron scale.

Thus, an object of the present invention is to improve the sustainability of the mold release ability of a mold of which the surface has a porous alumina layer.

Solution to Problem

A mold release processing method according to an embodiment of the present invention includes the steps of:
(a) providing a mold releasing agent, including a fluorine-based silane coupling agent and a solvent, and a mold of which the surface has a porous alumina layer; (b) applying the mold releasing agent onto the surface; and (c) heating, either before or after the step (b), the surface to a temperature not less than 40° C. and less than 100° C. in an ambient with a relative humidity of 50% or more.

In one embodiment, the step (c) includes the step (c1) of heating, before the step (b), the surface to a temperature not less than 40° C. and less than 100° C. in an ambient with a relative humidity of 50% to 90%.

A mold release processing method according to an embodiment further includes the step of rinsing the surface, to which the mold releasing agent has been applied, with a fluorine-based solvent.

In one embodiment, the step (c) includes the step (c2) of heating, after the step (b), the surface to a temperature not less than 50° C. and less than 100° C. in an ambient with a relative humidity of 50% to 90%.

In one embodiment, the step (c) includes the steps of: (c1) heating, before the step (b), the surface to a temperature not less than 40° C. and less than 100° C. in an ambient with a relative humidity of 50% to 90%; and (c2) heating, after the step (b), the surface to a temperature not less than 50° C. and less than 100° C. in an ambient with a relative humidity of 50% to 90%.

A mold release processing method according to an embodiment further includes the step of rinsing the surface, to which the mold releasing agent has been applied, with a fluorine-based solvent.

In one embodiment, the fluorine-based silane coupling agent included in the mold releasing agent has a concentration of not more than 0.002 mol/L. The reason is that if the concentration of the fluorine-based silane coupling agent were more than 0.002 mol/L, the surface of the film peeled would be likely to get uneven and the effect of increasing the mold release ability would not be enhanced. However, the fluorine-based silane coupling agent suitably has a concentration of at least 0.0004 mol/L. The reason is that if the fluorine-based silane coupling agent had a concentration of less than 0.0004 mol/L, the mold release ability would be insufficient.

In one embodiment, the fluorine-based silane coupling agent is perfluoropolyether-modified silane.

In one embodiment, the fluorine-based silane coupling agent is perfluoropolyether-modified alkoxy silane. This alkoxy silane may be trimethoxy silane, for example, and the fluorine-based silane coupling agent includes one or two or more trimethoxy silanes. The molecular weight of the fluorine-based silane coupling agent suitably falls within the range of 1000 to 10000.

In one embodiment, the mold has a roll shape and includes the porous alumina layer on its outer peripheral surface.

A method of making an antireflection film according to an embodiment of the present invention includes the steps of: providing a mold which has been subjected to a mold release process by a method according to any of the embodiments described above; providing a workpiece; irradiating a photocurable resin which is interposed between the mold and the workpiece with light, thereby curing the photocurable resin; and peeling an antireflection film of the photocurable resin that has been cured off the mold.

In one embodiment, the workpiece is a roll-shaped film and the process is carried out by roll-to-roll method.

In one embodiment, the film includes a base film and a hard coat layer which has been formed on the base film. And the antireflection film is formed on the hard coat film.

Advantageous Effects of Invention

According to embodiments of the present invention, a mold, of which the surface has a porous alumina layer, can have its mold release ability sustained for a longer period of time. In addition, an antireflection film can be mass-produced much more efficiently using a moth-eye mold, for example.

DESCRIPTION OF EMBODIMENTS

Figure 1:
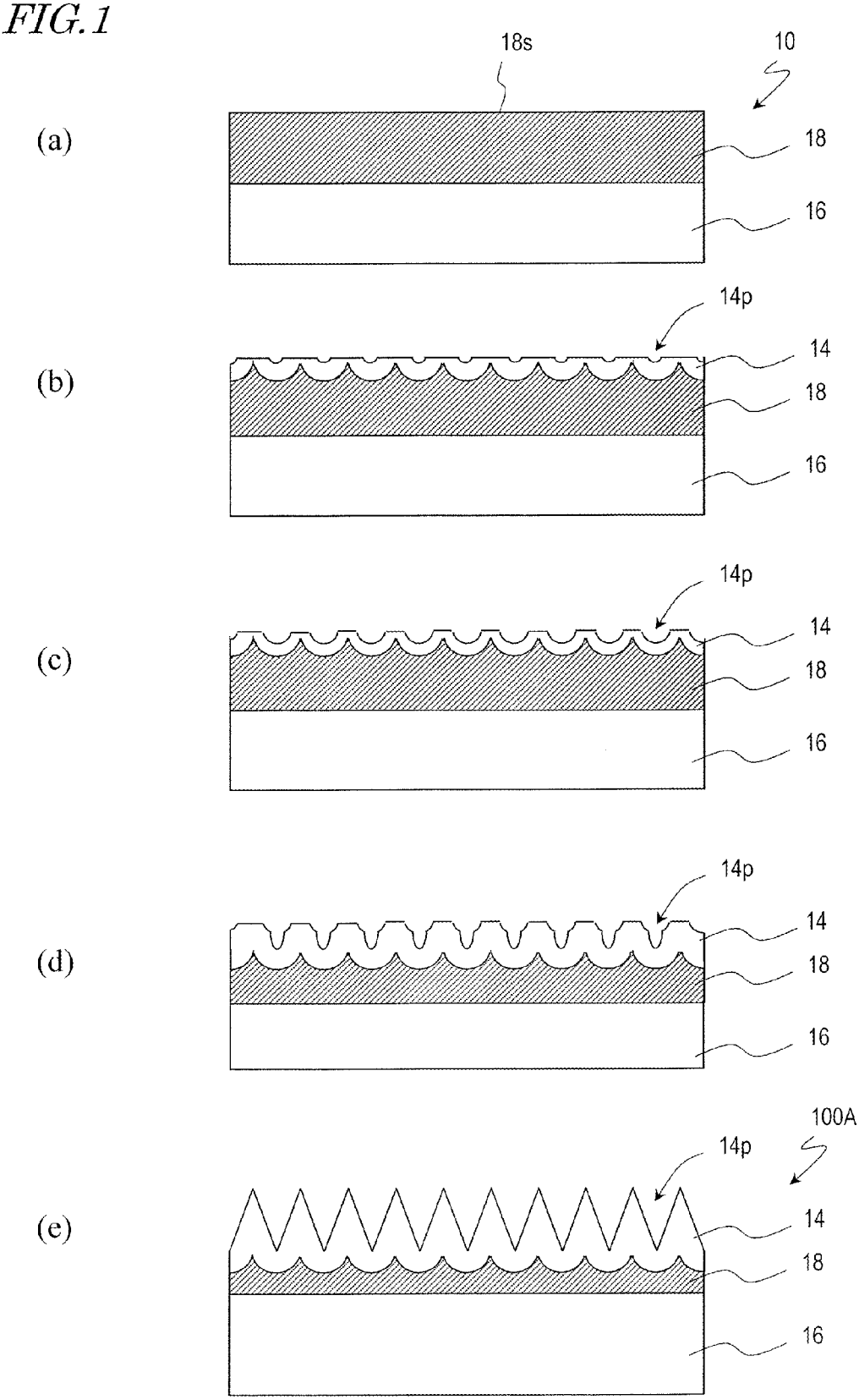
FIG. 1 (a) through (e) illustrate respective manufacturing process steps to make a mold with a porous alumina layer.

Hereinafter, a mold release processing method according to the present invention will be described with reference to the accompanying drawings. In the following description, a moth-eye mold to be used to make an antireflection film will be described just as an example.

A mold according to an embodiment of the present invention is suitably used to make an antireflection film (antireflective surface). Very small recesses (nanopores) of a porous alumina layer to be used to make an antireflection film have a generally circular conical cross-sectional shape. It is recommended that the very small recesses have a two-dimensional size (hole diameter: $D_p$) of about 10 nm to less than about 500 nm and a depth ($D_{depth}$) of about 10 nm to less than about 1000 nm (=1 μm). It is also recommended that the lower portion of the very small recesses be tapered (with a pointed bottom). Furthermore, it is preferred that the very small recesses have a closely packed arrangement. Supposing that the very small recesses have a circular shape when viewed along a normal to the porous alumina layer, it is preferred that adjacent circles overlap with each other and a saddle portion be formed between adjacent ones of the very small recesses. It should be noted that when the generally circular conical very small recesses are adjacent to each other to form saddle portions between them, the two-dimensional size $D_p$ of the very small recesses is equal to the average interval $D_{int}$ between those adjacent recesses. Thus, the porous alumina layer of the moth-eye mold for use to make the antireflection film preferably has a structure in which the very small recesses, of which $D_p=D_{int}$ is about 10 nm to less than about 500 nm and $D_{depth}$ is about 10 nm to less than about 1000 nm (1 μm), are arranged densely to form an irregular pattern. Strictly speaking, those holes of the very small recesses do not have a circular shape. That is why $D_p$ is preferably obtained based on an SEM image of the surface. The porous alumina layer has a thickness $t_p$ of about 1 μm or less.

A mold according to an embodiment of the present invention may be formed out of either an aluminum film which has been deposited on a substrate or a bulk member of aluminum (such as an aluminum substrate or an aluminum circular cylinder or pole). The mold may have a roll shape, for example, and may have a porous alumina layer on its outer peripheral surface. With such a roll-shaped mold adopted, the surface structure of the mold can be transferred continuously onto a workpiece (i.e., an object, of which the surface should be coated with an antireflection film) by spinning the roll-shaped mold on its axis, which is beneficial.

A method of making an antireflection film according to an embodiment of the present invention includes the steps of: providing a mold which has been subjected to a mold release process by the method to be described later; providing a workpiece; irradiating a photocurable resin which is interposed between the mold and the workpiece with light, thereby curing the photocurable resin; and peeling an antireflection film of the photocurable resin that has been cured off the mold. If a roll-shaped film is used as the workpiece, an antireflection film can be made by roll-to-roll method. The film suitably includes a base film and a hard coat layer which has been formed on the base film. The antireflection film is suitably formed on the hard coat layer. As the base film, a TAC (triacetyl cellulose) film is suitably used, for example. And the hard coat layer may be made of an acrylic hard coat material, for example.

First of all, it will be described with reference to FIG. 1 how a mold with a porous alumina layer may be made.

A mold base 10 is provided as shown in FIG. 1(a). The mold base 10 includes a supporting body (not shown), an insulating layer 16 which has been formed on the supporting body, and an aluminum layer 18 which has been deposited on the insulating layer 16. Optionally, the aluminum layer 18 may be replaced with an aluminum alloy layer.

Next, as shown in FIG. 1(b), the surface of the base 10 (i.e., the surface 18s of the aluminum layer 18) is anodized to form a porous alumina layer 14 which has a lot of nanopores 14p (i.e., very small recesses). The porous alumina layer 14 includes a porous layer with the nanopores 14p and a barrier layer. The porous alumina layer 14 may be formed by anodizing the surface 18s in an acidic electrolytic solution, for example. The electrolytic solution used in the step of forming this porous alumina layer 14 may be, for example, an aqueous solution which includes an acid selected from the group consisting of oxalic acid, tartaric acid, phosphoric acid, chromic acid, citric acid, and malic acid. By adjusting the anodization condition (e.g., the type of the electrolytic solution, the applied voltage), the interval between the nanopores and the depth and shape of the nanopores, for example, can be controlled. It should be noted that the thickness of the porous alumina layer 14 may be changed as needed. Optionally, the aluminum layer 18 may be entirely anodized.

Then, as shown in FIG. 1(c), the porous alumina layer 14 is etched to predetermined degrees by bringing it into contact with an alumina etchant, thereby increasing the pore diameter of the nanopores 14p. In this case, if wet etching is adopted, the pore wall and the barrier layer can be etched almost isotropically. By changing the type and concentration of the etch solution and by adjusting the etching time, the etched dimensions (i.e., the size and depth of the nanopores 14p) can be controlled. Examples of etch solutions to use include an aqueous solution of 10 mass % phosphoric acid, an aqueous solution of an organic acid such as formic acid, acetic acid or citric acid, and an aqueous solution of a mixture of chromium and phosphoric acid.

Then, as shown in FIG. 1(d), the aluminum layer 18 is partially anodized again so that the nanopores 14p grow in the depth direction and that the porous alumina layer 14 increases its thickness. In this case, since the nanopores 14p start to grow at the bottom of the existent nanopores 14p, the resultant nanopores 14p come to have a stepped side surface.

Thereafter, if necessary, the porous alumina layer 14 may be further etched by bringing it into contact with the alumina etchant again, thereby further increasing the pore diameter of the nanopores 14p. The etch solution used in this process step may be any of the etching solutions mentioned above. In practice, the same etching bath may be used once again.

In this manner, by performing these anodization and etching process steps alternately a number of times, a moth-eye mold 100A with the porous alumina layer 14 in an intended uneven shape can be obtained as shown in FIG. 1(e).

A porous alumina layer, in which $D_{int}=D_p=180$ nm, $D_{depth}=300$ nm, $t_p=400$ nm, and the barrier layer has a thickness $t_b$ of about 100 nm, may be formed in the following manner.

Specifically, an aluminum layer which has been deposited (to a thickness of about 1 μm) on a glass substrate is anodized at a formation voltage of 80 V applied for 60 seconds using a 0.1 M oxalic acid aqueous solution (at 18° C.) as the electrolytic solution, and then immersed in a 2 mass % phosphoric acid aqueous solution (at 30° C.) as an etching solution for 90 minutes, thereby removing an anodized layer which has been formed as result of the previous anodization process step. Since the very small uneven structure of the porous alumina layer that has been formed for the first time is often not stabilized, the first porous alumina layer that has been formed may be removed once and then another porous alumina layer is suitably formed in order to increase the reproducibility.

Thereafter, the anodization and etching process steps are performed alternately and repeatedly (specifically, five times and four times, respectively) using the same electrolytic solution and same etching solution as the ones described above and at the same temperatures as the ones described above. In this case, each cycle in which the anodization and etching are performed alternately ends with the anodization process step. And a single anodization process step is performed for 25 seconds and a single etching process step is performed for 19 minutes.

A mold release processing method according to the present invention includes the steps of: providing a mold releasing agent, including a fluorine-based silane coupling agent and a solvent, and a mold of which the surface has a porous alumina layer; applying the mold releasing agent onto the surface; and heating, either before or after the step of applying the mold releasing agent, the surface to a temperature not less than 40° C. and less than 100° C. in an ambient with a relative humidity of 50% or more.

As will be described later by way of illustrative examples, the method may include the step of heating, before the step of applying the mold releasing agent, the surface to a temperature not less than 40° C. and less than 100° C. in an ambient with a relative humidity of 50% to 90% (as in Example 1). Alternatively, the method may include the step of heating, after the step of applying the mold releasing agent, the surface to a temperature not less than 50° C. and less than 100° C. in an ambient with a relative humidity of 50% to 90% (as in Example 2). Still alternatively, the method may include the step of heating, before the step of applying the mold releasing agent, the surface to a temperature not less than 40° C. and less than 100° C. in an ambient with a relative humidity of 50% to 90% and the step of heating, after the step of applying the mold releasing agent, the surface to a temperature not less than 50° C. and less than 100° C. in an ambient with a relative humidity of 50% to 90% (as in Example 3). In any of these cases, the method may further include the step of rinsing the surface, to which the mold releasing agent has been applied, with a fluorine-based solvent. By performing this rinsing process step, the extra silane coupling agent which has been deposited on the porous alumina layer can be removed and a film with a more uniform thickness (of about 2 to 3 μm) can be obtained. After the surface has been rinsed, the surface may be dried naturally in a clean environment (at room temperature).

The fluorine-based silane coupling agent included in the mold releasing agent includes a fluorine-containing hydrocarbon group with mold release ability and a hydrolytic group such as alkoxy silane. The solvent included in the mold releasing agent is a fluorine-based solvent, which has a low degree of chemical activity, a relatively small molecular weight and a high degree of volatility. The fluorine-based silane coupling agent included in the mold releasing agent suitably has a concentration of not more than 0.002 mol/L. The reason is that if the concentration of the fluorine-based silane coupling agent were more than 0.002 mol/L, the surface of the film peeled would be likely to get uneven and the effect of increasing the mold release ability would not be enhanced. Meanwhile, the fluorine-based silane coupling agent suitably has a concentration of at least 0.0004 mol/L. The reason is that if the fluorine-based silane coupling agent had a concentration of less than 0.0004 mol/L, sometimes the mold release ability would be insufficient. The fluorine-based silane coupling agent is suitably perfluoropolyether-modified alkoxy silane. The mold releasing agent for use in an embodiment of the present invention includes what is on the market under the name "fluorine-based coating agent" or "fluorine-based surface treatment agent".

The applicant of the present application discloses, in the preceding PCT international application (that is PCT International Application Publication No. 2012/133390), how to improve the sustainability of mold release ability by using the same mold releasing agent as the one that is also used in the mold release processing according to an embodiment of the present invention. According to the present invention, the sustainability of the mold release ability can be further improved compared to the mold release processing method that is disclosed in the preceding PCT international application (and will be sometimes referred to herein as a "double processing method"). It should be noted that as disclosed in the preceding PCT international application, the molecular weight and concentration of the fluorine-based silane coupling agent (which is fluorine-based compound with mold release ability such as perfluoropolyether-modified trimethoxy silane) suitably also fall within the ranges specified above. The entire disclosure of the preceding PCT international application (that is POT International Application Publication No. 2012/133390) is hereby incorporated by reference.

The mold release processing method disclosed in the preceding PCT international application is partly characterized by performing the process step of applying the mold releasing agent twice in order to apply the fluorine-based silane coupling agent more closely onto the surface of the mold. On the other hand, according to the mold release processing method of an embodiment of the present invention, even though the mold release processing is performed only once, the sustainability of the mold release ability can still be improved compared to the double processing method disclosed in that preceding PCT international application.

Hereinafter, it will be described with reference to FIG. 2 exactly by what mechanism the sustainability of the mold release ability can be improved by a mold release processing method according to an embodiment of the present invention. It should be noted that the mechanism to be described below is nothing but what the present inventors presume to be working there and never limits the scope of the present invention.

Figure 2:
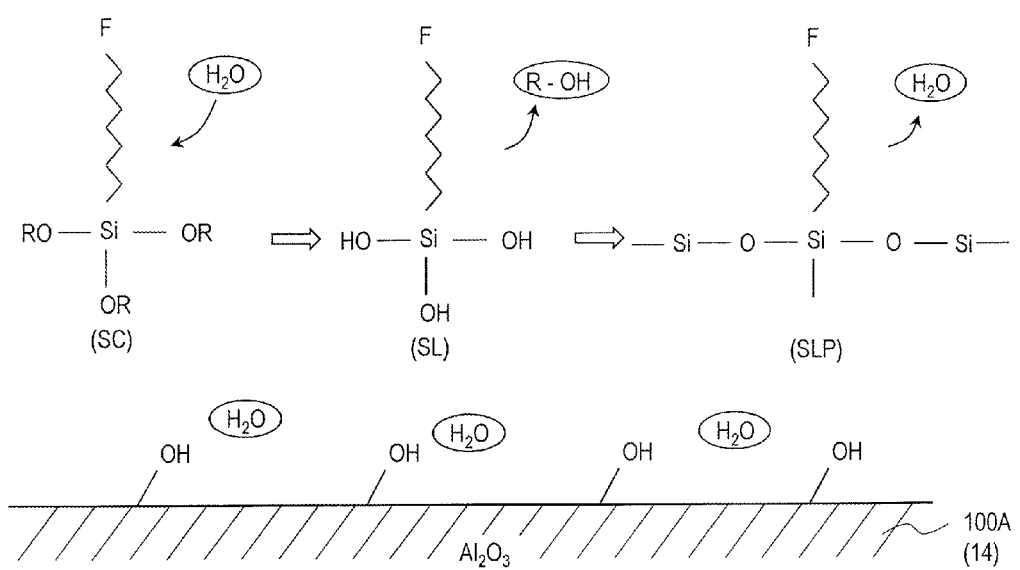
FIG. 2 Illustrates a mechanism by which the surface of a mold with a porous alumina layer undergoes a mold release process.

As shown in FIG. 2, there are hydroxyl (OH) groups on the surface of the porous alumina layer 14 of the mold 100A. Also, water molecules have adsorbed onto the surface of the porous alumina layer 14.

The silane coupling agent (SC) and either water molecules in the ambient or the water molecules that have adsorbed onto the surface of the porous alumina layer 14 cause a hydrolysis reaction. In FIG. 2, OR indicates an alkoxy group, and a group with F schematically indicates a fluorine-containing hydrocarbon group with mold release ability, which may be a perfluoropolyether group or a perfluorohydrocarbon group, for example. As a result of the hydrolysis reaction, a silanol compound (SL) and alcohol (R—OH) are produced. If a dehydration condensation reaction occurs between silanol groups in the silanol compound (SL), a siloxane bond is produced. Since a silane coupling agent typically has three alkoxy groups as illustrated in FIG. 2, the silanol compound (SL) has three silanol groups in a single molecule. That is why if a dehydration condensation occurs between the silanol groups, a cross-linked structure will be formed. Also, some silanol groups may cause a dehydration condensation with hydroxyl groups on the surface of the porous alumina layer 14. If such a dehydration condensation has occurred between the hydroxyl groups (i.e., silanol and surface hydroxyl groups), the surface of the porous alumina layer 14 will be covered with a film of siloxane polymers (SLP).

If siloxane polymers with the cross-linked structure have been produced and if a covalent bond (—OH—) has been formed between some siloxane polymers and the surface hydroxyl groups as described above, the siloxane polymers would strongly bond to the surface of the porous alumina layer 14 and stabilized mold release ability would be achieved. It should be noted that even if not every hydroxyl group (including a silanol group) forms a covalent bond as a result of the dehydration condensation, a hydrogen bond may still be formed between the hydroxyl groups, and therefore, the siloxane polymers can still strongly bond to the surface of the porous alumina layer 14 and stabilized mold release ability can also be achieved.

Thus, the present inventors thought of introducing more hydroxyl groups and/or adsorbed water onto the surface of the porous alumina layer and getting a hydrolysis of the silane coupling agent done more securely in order to realize such an ideal structure. For that purpose, a mold release processing method according to an embodiment of the present invention includes the step of heating, either before or after the step of applying a silane coupling agent onto the surface of a porous alumina layer, the surface to a temperature not less than 40° C. and less than 100° C. in an ambient with a relative humidity of 50% or more.

By performing the heating process step in an ambient with a relative humidity of 50% or more before the step of applying a silane coupling agent, not only hydroxyl groups are produced, but also the amount of adsorbed water increases, on the surface of the porous alumina layer 14. The surface hydroxyl groups will contribute to forming either a covalent bond or a hydrogen bond with the siloxane polymers and the adsorbed water can be used to make a hydrolysis of the silane coupling agent.

In this case, the heating temperature is suitably equal to or higher than 40° C. The reason is that if the heating temperature were lower than 40° C., the effect of introducing hydroxyl groups onto the surface would not be achieved significantly. Although it depends on the heating time, the heating temperature should be lower than 100° C. The reason is that if the heating temperature were too high or if the heating time were too long, a so-called "pore closing" phenomenon would arise (i.e., the nanopores of the porous alumina layer 14 would be closed), and therefore, an intended mold could not be obtained. Thus, to avoid the pore closing phenomenon, the heating temperature is suitably 90° C. or less, and more suitably 80° C. or less.

On the other hand, by performing the heating process step in an ambient with a relative humidity of 50% or more after the step of applying a silane coupling agent, the hydrolysis of the silane coupling agent can be promoted.

In this case, the heating temperature is suitably equal to or higher than 40° C., and more suitably equal to or higher than 50° C. The reason is that if the heating temperature were lower than 40° C., the effect of making the hydrolysis of the silane coupling agent would not be achieved significantly. Although it depends on the heating time, the heating temperature should be lower than 100° C. The reason is that if the heating temperature were too high or if the heating time were too long, a so-called "pore closing" phenomenon would arise. Thus, to avoid the pore closing phenomenon, the heating temperature is suitably 90° C. or less, and more suitably 80° C. or less.

Naturally, as will be described later as Example 3, the heating process may be carried out under the humidity condition specified above before AND after the process step of applying the silane coupling agent.

Optionally, after the silane coupling agent has been applied, a rinsing process step may be carried out as needed. The rinsing process step may be performed by leaving a mold to which the silane coupling agent has been applied in the air at room temperature for a certain period of time (e.g., for one day) and then immersing the mold in a fluorine-based solvent. Alternatively, the rinsing process step may also be carried out by showering the mold to which the silane coupling agent has been applied with a fluorine-based solvent. In this case, the fluorine-based solvent may be of the same kind as the fluorine-based solvent that is included, along with the silane coupling agent, in the mold releasing agent. By performing this rinsing process step, the extra silane coupling agent which has been deposited on the porous alumina layer can be removed and a film with a more uniform thickness (of about 2 to 3 μm) can be obtained. After the surface has been rinsed, the surface may be dried naturally in a clean environment (at room temperature).

A mold release processing method according to this embodiment of the present invention will achieve a significant effect particularly when applied to a roll-shaped moth-eye mold for use to make an antireflection film by the roll-to-roll method described above.

Hereinafter, it will be described with reference to FIG. 3 how to make a roll-shaped mold.

The roll-shaped mold was made by the method disclosed in POT International Application Publication No. 2011/105206 by the applicant of the present application. In this case, a metallic sleeve of stainless steel or nickel was used. In this description, the "metallic sleeve" refers herein to a metallic cylinder with a thickness of 0.02 mm to 1.0 mm. The entire disclosure of PCT International Application Publication No. 2011/105206 is herein incorporated by reference.

Figure 3:
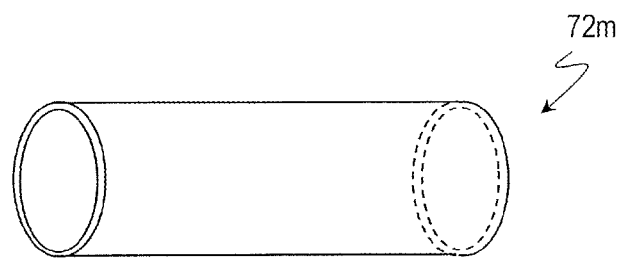
FIG. 3 (a) through (e) illustrate respective process steps to make a roll-shaped mold using a metallic sleeve.
Figure 3:
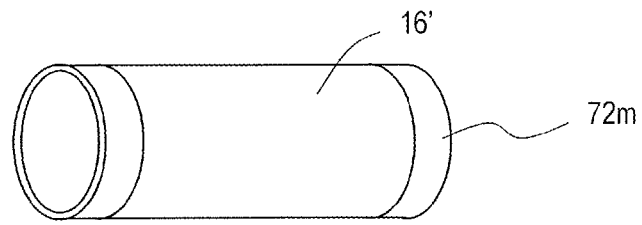
Figure 3:
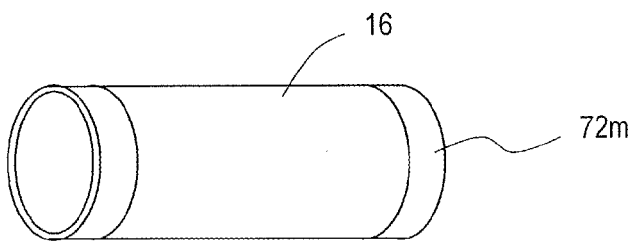
Figure 3:
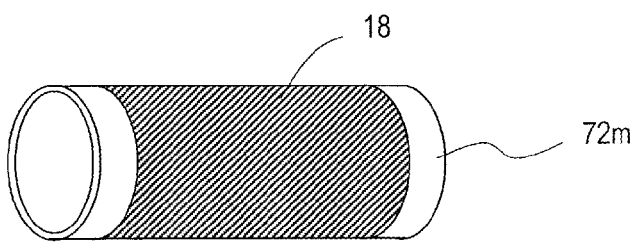
Figure 3:
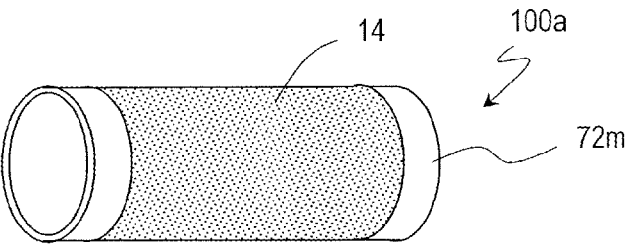

First of all, as shown in FIG. 3(*a*), a metallic sleeve 72*m* and a curable resin (not shown) are provided.

Next, as shown in FIG. 3(*b*), the curable resin is applied onto the outer peripheral surface of the metallic sleeve 72*m* to form a curable resin layer 16' there. As the curable resin, a resin including polyamic acid may be used, for example.

Then, by curing the curable resin layer 16', an insulating layer 16 is formed on the outer peripheral surface of the metallic sleeve 72*m* as shown in FIG. 3(*c*). For example, if thermosetting polyamic acid is used as the curable resin, an insulating layer 16 of polyimide resin can be formed by heating the resin to about 300° C.

Alternatively, the insulating layer 16 may also be formed by electrodeposition method, for example. The electrodeposition method may be a known electrodeposition coating method, for example. For instance, first of all, the metallic sleeve 72*m* is cleaned. Next, the metallic sleeve 72*m* is immersed in an electrodeposition bath in which an electrodeposition solution including an electrodeposited resin has been poured. In the electrodeposition bath, an electrode has been installed. If an electrically insulating resin layer needs to be formed by cationic electrodeposition, current is allowed to flow between the metallic sleeve 72*m* and the anode by using the metallic sleeve 72*m* as a cathode and the electrode installed in the electrodeposition bath as an anode, respectively, and the electrodeposited resin is deposited on the outer peripheral surface of the metallic sleeve 72*m*, thereby forming an electrically insulating resin layer there. On the other hand, if an electrically insulating resin layer needs to be formed by anionic electrodeposition, current is allowed to flow by using the metallic sleeve 72*m* as an anode and the electrode installed in the electrodeposition bath as a cathode, respectively, thereby forming an electrically insulating resin layer there. And by performing a cleaning process step and a baking process step, the insulating layer 16 is formed. Examples of electrodeposited resins to be used include a polyimide resin, an epoxy resin, an acrylic resin, a melamine resin, a urethane resin, and a mixture thereof.

The insulating layer 16 may also be formed by forming an electrically insulating resin layer by any of various coating methods instead of the electrodeposition method and then curing the electrically insulating resin layer as needed. The insulating layer 16 made of an organic resin achieves the effect of planarizing the surface significantly and can prevent scratches and other imperfections on the surface of the metallic sleeve 72*m* from affecting the surface shape of the aluminum layer 18.

Optionally, if a matting agent, for example, is added to the electrodeposited resin, the insulating layer 16 can be formed to have a surface with an antiglare property. Specifically, if a matting agent is added to an acrylic melamine resin, for example, a surface with projections having a two-dimensional spread (in a substantially circular shape) of about 20 μm and a height of slightly less than 1 μm when viewed along a normal to the layer can be obtained.

Next, as shown in FIG. 3(*d*), aluminum is deposited on the insulating layer 16 by a thin film deposition method, thereby forming an aluminum layer 18.

Then, as shown in FIG. 3(*e*), anodization and etching process steps are performed alternately and repeatedly on the surface of the aluminum layer 18, thereby forming a porous alumina layer 14 with a plurality of very small recesses. In this manner, the mold 100*a* is obtained.

Figure 4:
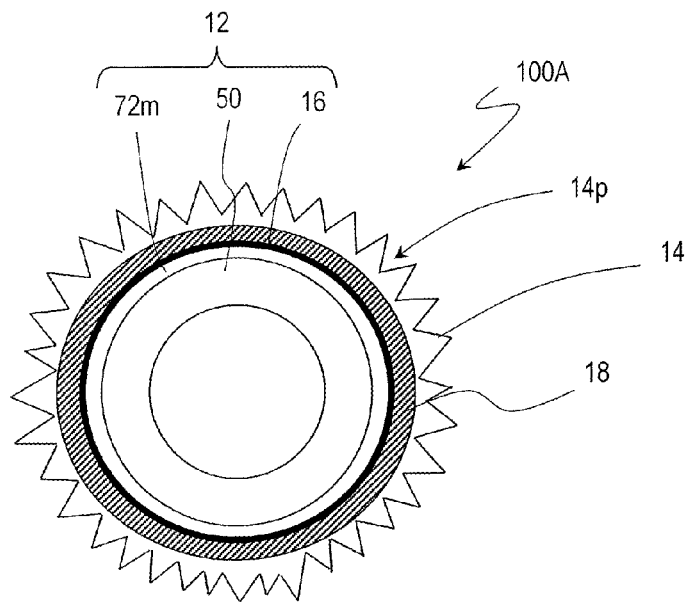
FIG. 4 A cross-sectional view schematically illustrating the structure of a mold 100A with a metallic sleeve 72m.

Since the metallic sleeve 72*m* is easily deformable, it is difficult to use the mold 100*a* as it is. That is why by inserting a core member 50 into the metallic sleeve 72*m* of the mold 100*a* as shown in FIG. 4, a mold 100A which can be used to make an antireflection film by the roll-to-roll method is obtained. In this mold 100A, the core member 50, the metallic sleeve 72*m* and the insulating layer 16 together function as the supporting body 12.

Hereinafter, a method of making an antireflection film according to an embodiment of the present invention will be described with reference to FIG. 5, which is a schematic cross-sectional view illustrating how to make an antireflection film by the roll-to-roll method.

First of all, a roll-shaped moth-eye mold 100A such as the one shown in FIG. 4 is provided.

Figure 5:
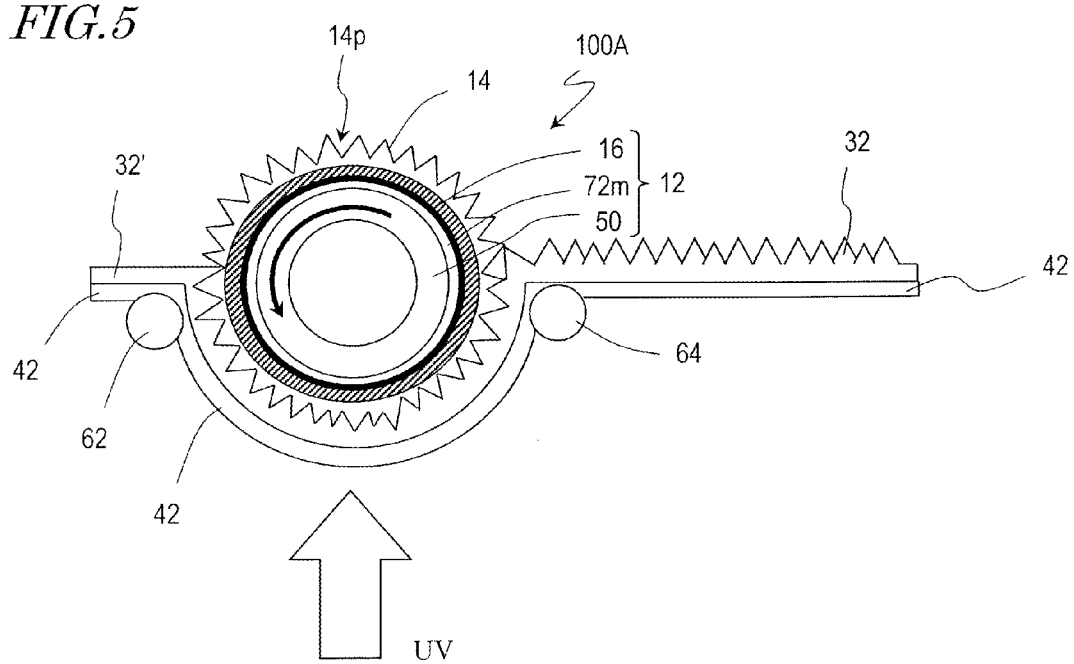
FIG. 5 A schematic representation illustrating a method of making an antireflection film according to an embodiment of the present invention.

Next, as shown in FIG. 5, a workpiece 42, of which the surface is coated with a UV curable resin 32', is pressed against the moth-eye mold 100A with the UV curable resin 32' irradiated with an ultraviolet ray (UV), thereby getting the UV curable resin 32' cured. As the UV curable resin 32', an acrylic resin may be used, for example. The workpiece 42 may be a TAC (triacetyl cellulose) film, for example. The workpiece 42 is let out of a let-out roller (not shown) and then the UV curable resin 32' is applied onto its surface by a split coater, for example. As shown in FIG. 5, the workpiece 42 is supported by two supporting rollers 62 and 64, which have a rotating mechanism and transport the workpiece 42. Meanwhile, the roll of moth-eye mold 100A is rotated in the direction indicated by the arrow in FIG. 5 at a rotational velocity corresponding to the transport velocity of the workpiece 42.

After that, by removing the moth-eye mold 100A from the workpiece 42, a cured layer 32, onto which the surface unevenness of the moth-eye mold 100A (i.e., an inverted moth-eye structure) has been transferred, is formed on the surface of the workpiece 42. Then, the workpiece 42 on which the cured layer 32 has been formed is reeled in a reel-in roller (not shown).

Figure 6:
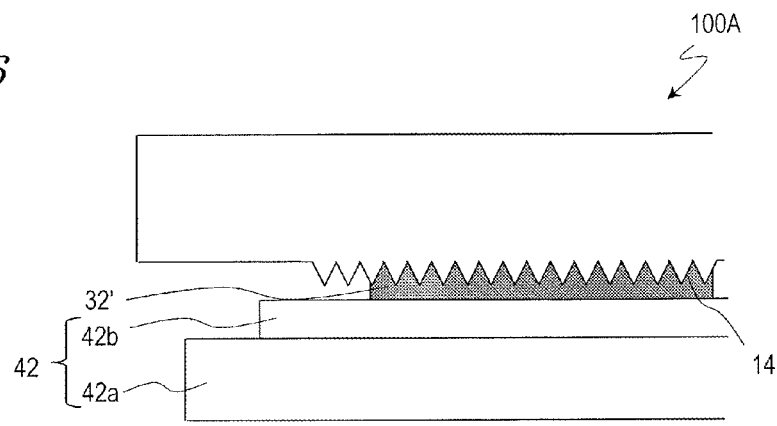
FIG. 6 Schematically illustrates the process step of forming an antireflection film out of a film including a base film 42a and a hard coat layer 42b.

In this case, if a film including a base film 42*a* of TAC and a hard coat layer 42*b* which has been formed on the TAC film 42*a* is used as the workpiece 42 as shown in FIG. 6, then the hard coat layer 42*b* may contact with the mold 100A. The present inventors discovered and confirmed via experiments that the porous alumina layer 14 of the mold 100A peeled from not only a region where the mold 100A was in contact with the UV curable resin 32' to be an antireflection layer but also a region where the mold 100A was in contact with the hard coat layer 42*b* (to be cured simultaneously with the UV curable resin 32').

For that reason, in the preceding PCT international application cited above, the mold release ability was evaluated with respect to not only the UV curable resin to be an antireflection film but also the UV curable resin to be a hard coat layer. The mold release ability of the mold was evaluated in the following manner.

The angle of contact defined by the mold surface with respect to water was measured with a contact angle gauge Drop Master 500 produced by Kyowa Interface Science Co., Ltd. The amount of water dropped was 3.0 microliters. Specifically, a drop of water of 3.0 microliters, which had been put on the tip of a micro-syringe, was brought into contact with the surface of the mold and then the syringe was retracted, thereby dripping the water drop onto the surface of the mold and leaving it there. Then, the angle of contact of the water drop left on the surface of the mold was measured with that contact angle gauge.

Meanwhile, an antireflection film was formed continuously by the roll-to-roll method using a mold 100A, including the mold 100a that had been subjected to the mold release processing described above, and the sustainability of the mold release ability with respect to the mold was evaluated. Also, the present inventors observed how the angle of contact with respect to the water on the mold's surface changed as the number of times of transfers (i.e., the number of revolutions of the roll-shaped mold) increased. As the photocurable resin to make the antireflection film, used was a UV curable acrylic resin including 1 mass % of a fluorine-based lubricant having a perfluoro group with a carbon number of six or less. Also, as the resin to make the hard coat layer, a UV curable acrylic resin for a hard coat layer was used.

According to the preceding PCT international application cited above, the sustainability of the mold release ability could be improved by performing the process step of applying the mold releasing agent twice or more. In this example, the sustainability of the mold release ability was evaluated using a small piece of flat-plate mold as disclosed in that preceding PCT international application.

The small piece of flat-plate mold was formed by the method that has already been described with reference to FIG. 1 using an aluminum layer which had been deposited to a thickness of about 1 μm on a glass substrate. As the glass substrate, a Corning 1737 glass plate with a size of 5 cm×5 cm and a thickness of 0.7 mm was used. The porous alumina layer of the small piece of flat-plate mold thus obtained had $D_{int}=D_p=180$ nm, $D_{depth}=300$ nm, $t_p=400$ nm, and a barrier layer thickness $t_b$ of about 100 nm.

The mold releasing agent was obtained by dissolving a silane coupling agent OPTOOL produced by Daikin Industries, Ltd. in a solvent ZV produced by Fluoro Technology. That OPTOOL had a concentration of 0.1 mass % (=0.0004 mol/L).

The mold release processing was carried out under the following condition. It should be noted that the process step of heating the surface of the mold to a temperature not less than 40° C. and less than 100° C., in an ambient with a relative humidity of 50% or more was carried out using a thermo-hygrostat AGREE CHAMBER THC-715-800 produced by FUTEC Inc.

Example 1

(A1) The mold described above was exposed for 30 minutes to an environment at a temperature of 60° C. and with a relative humidity of 90%;
(A2) Next, the mold releasing agent described above was applied through a dropper onto the surface of the mold that was held substantially perpendicularly;
(A3) After that, the mold was left for three minutes and dried naturally to vaporize the solvent; and
(A4) The mold was showered for 10 minutes with the solvent ZV produced by Fluoro Technology and then dried naturally in a clean environment (at room temperature).

Example 2

(B1) The mold releasing agent described above was applied through a dropper onto the surface of the mold that was held substantially perpendicularly;
(B2) After that, the mold was left for three minutes and dried naturally to vaporize the solvent;
(B3) Next, the mold was exposed for 30 minutes to an environment at a temperature of 90° C. and with a relative humidity of 90%; and
(B4) The mold was showered for 10 minutes with the solvent ZV produced by Fluoro Technology and then dried naturally in a clean environment (at room temperature).

Example 3

(C1) The mold described above was exposed for 30 minutes to an environment at a temperature of 60° C. and with a relative humidity of 90%;
(C2) Next, the mold releasing agent described above was applied through a dropper onto the surface of the mold that was held substantially perpendicularly;
(C3) After that, the mold was left for three minutes and dried naturally to vaporize the solvent;
(C4) Subsequently, the mold was exposed for 30 minutes to an environment at a temperature of 90° C. and with a relative humidity of 90%; and
(C5) The mold was showered for 10 minutes with the solvent ZV produced by Fluoro Technology and then dried naturally in a clean environment (at room temperature).

Comparative Example 1

(D1) The mold releasing agent described above was applied through a dropper onto the surface of the mold that was held substantially perpendicularly;
(D2) After that, the mold was left for three minutes and dried naturally to vaporize the solvent; and
(D3) Finally, the mold was put at rest on a hot plate and heated to 100° C. for 15 minutes.

Comparative Example 2

(E1) The mold releasing agent described above was applied through a dropper onto the surface of the mold that was held substantially perpendicularly;
(E2) After that, the mold was left for three minutes and dried naturally to vaporize the solvent;
(E3) These process steps (E1) and (E2) were carried out all over again; and
(E4) Finally, the mold was put at rest on a hot plate and heated to 100° C. for 15 minutes.

These various kinds of molds that had been subjected to the mold release processing described above had the sustainability of their mold release ability evaluated in the following manner.

The mold release ability was evaluated by the angle of contact. Specifically, the angle of contact defined by the mold's surface with respect to n-hexadecane was measured with a contact angle gauge D-500 produced by Kyowa Interface Science Co., Ltd. The amount of n-hexadecane dropped was 5.0 microliters.

Figure 7:
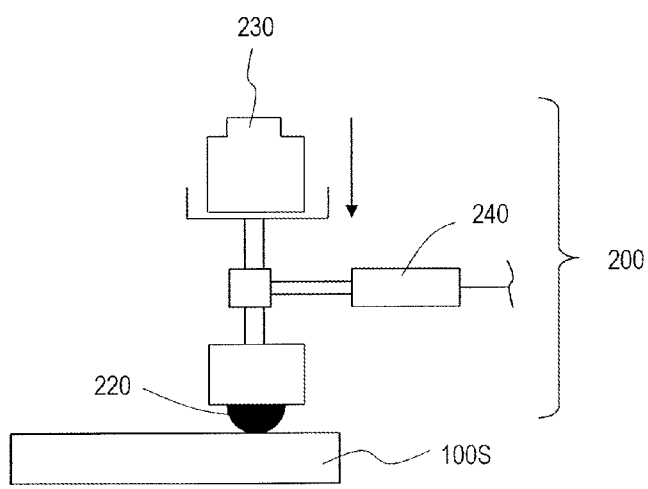
FIG. 7 Schematically illustrates the structure of a surface property tester 200.

The sustainability of the mold release ability was evaluated by generating friction on the surface of each of these various molds with the surface property tester 200 shown in FIG. 7 and by observing how the contact angle changed with the number of times of generation of friction. That is to say, a mold, of which the contact angle did not change even with the friction generated, was regarded as having good sustainability of its mold release ability. In this example, 14FW produced by HEIDEN was used as the surface property tester 200.

The surface property tester 200 includes a ball 220 which can move relative to a test piece 100S (which is the small piece of flat-plate mold described above in this example). This ball 220 slides and goes back and forth on the mold's mold-release-processed surface while keeping in contact with that surface. The pressure to press the ball 220 against the surface of the mold is controlled by adjusting the load 230. The sensor 240 measures the pressure applied to the ball 220. In this example, the ball 220 was made to slide 40 mm in one reciprocating movement (i.e., every time friction was generated there) at a linear velocity of 2000 mm/min with a load 230 of 100 g applied.

Figure 8:
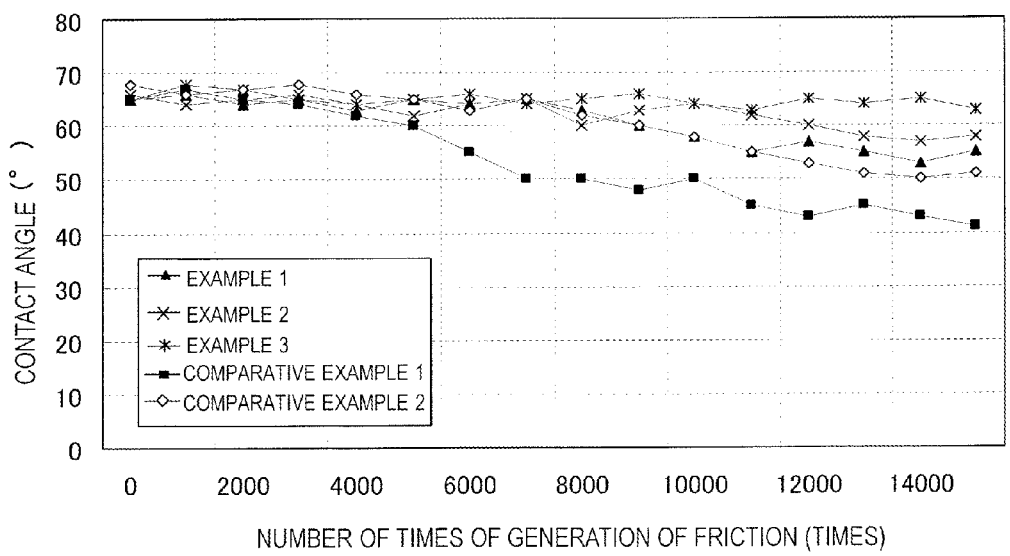
FIG. 8 A graph showing how the contact angle changes with the number of times of generation of friction.

FIG. 8 is a graph showing the relations between the number of times of generation of friction and the contact angle which were obtained as described above for the respective molds.

As can be seen easily from FIG. 8, the contact angle of a mold that had been subjected to the mold release processing of any of Examples 1 to 3 varied less with the number of times of generation of friction than that of a mold that had been subjected to the mold release processing of any of Comparative Examples 1 and 2.

Specifically, in the mold of Comparative Example 1, its contact angle starts to decrease when the number of times of generation of friction reaches approximately 5000 times, and then goes on decreasing after that. On the other hand, in the mold of Comparative Example 2 obtained by the double processing as disclosed in the preceding PCT international application cited above, its contact angle starts to decrease when the number of times of generation of friction reaches approximately 8000 times.

In the mold of Example 1, a decrease in its contact angle is also seen as in the mold of Comparative Example 2 when the number of times of generation of friction reaches 8000 times. After that, however, the contact angle of the mold of Example 1 decreases less than that of the mold of Comparative Example 2. And when the number of times of generation of friction exceeds 12000 times, the mold of Example 1 maintains a larger contact angle than that of Comparative Example 2.

In each of the molds of Examples 2 and 3, even after the number of times of generation of friction has exceeded 10000 times, the contact angle decreases only a little. Particularly, the mold of Example 3 which has been subjected to the heat treatments in a high-humidity ambient before and after the mold releasing agent is applied maintains a large contact angle even after the number of times of generation of friction has exceeded 14000 times.

As can be seen from the foregoing description, the mold release processing method according to an embodiment of the present invention can improve the sustainability of the mold release ability of a mold, of which the surface has a porous alumina layer.

INDUSTRIAL APPLICABILITY

The present invention can be used effectively to make a mold with a porous alumina layer and to make an antireflection film using such a mold.

REFERENCE SIGNS LIST

12 supporting body
14 porous alumina layer
14$p$ nanopore (very small recess)
16 insulating layer
18 aluminum layer or aluminum alloy layer
18$s$ surface of aluminum layer
32' UV curable resin
32 cured layer
42 workpiece
42$a$ base film
42$b$ hard coat layer
50 core member
100$a$, 100A moth-eye mold

The invention claimed is:

1. A mold release processing method comprising the steps of:
   (a) providing a mold releasing agent, including a fluorine-based silane coupling agent and a solvent, and a mold of which the surface has a porous alumina layer;
   (b) applying the mold releasing agent onto a surface of the porous alumina layer to which no mold releasing agent has been applied yet;
   (c1) heating, after a final anodizing step of the mold and before the step (b), the surface of the porous alumina layer to a temperature not less than 40° C. and less than 100° C. in an ambient with a relative humidity of 50% to 90%; and
   (c2) heating, after the step (b), the surface of the mold to a temperature not less than 50° C. and less than 100° C. in an ambient with a relative humidity of 50% to 90%.

2. The mold release processing method of claim 1, further comprising the step of rinsing the surface of the mold, to which the mold releasing agent has been applied, with a fluorine-based solvent.

3. The mold release processing method of claim 1, wherein the fluorine-based silane coupling agent included in the mold releasing agent has a concentration of not more than 0.002 mol/L.

4. The mold release processing method of claim 1, wherein the fluorine-based silane coupling agent is perfluoropolyether-modified alkoxy silane.

5. The mold release processing method of claim 1, wherein the step (b) is the only step for applying the mold releasing agent onto the surface of the porous alumina layer.

6. A method of making an antireflection film, the method comprising the steps of:
   providing a mold which has been subjected to a mold release process, wherein the mold release process comprises the steps of:
   (a) providing a mold releasing agent, including a fluorine-based silane coupling agent and a solvent, and a mold of which the surface has a porous alumina layer;
   (b) applying the mold releasing agent onto a surface of the porous alumina layer to which no mold releasing agent has been applied yet;
   (c1) heating, after a final anodizing step of the mold and before the step (b), the surface of the porous alumina layer to a temperature not less than 40*C and less than 100° C. in an ambient with a relative humidity of 50% to 90%; and
   (c2) heating, after the step (b), the surface of the mold to a temperature not less than 50° C. and less than 100° C. in an ambient with a relative humidity of 50% to 90%; providing a workpiece;

irradiating a photocurable resin which is interposed between the mold and the workpiece with light, thereby curing the photocurable resin; and peeling an antireflection film of the photocurable resin that has been cured off the mold.

* * * * *